United States Patent
Takahashi et al.

[11] Patent Number: 5,360,183
[45] Date of Patent: Nov. 1, 1994

[54] PHOTOGRAPHIC FILM CASSETTE HAVING A FILM ANCHOR

[75] Inventors: Koichi Takahashi; Katsuhiko Tanaka, both of Kanagawa, Japan

[73] Assignee: Fuji Photo Film Co., Ltd., Kanagawa, Japan

[21] Appl. No.: 760,034

[22] Filed: Sep. 13, 1991

[30] Foreign Application Priority Data

Sep. 13, 1990 [JP] Japan .................. 2-242886

[51] Int. Cl.$^5$ .............................. B65H 75/28
[52] U.S. Cl. ...................... 242/587.3; 242/584.1
[58] Field of Search ............ 242/71.1, 74.1, 74.2

[56] References Cited

U.S. PATENT DOCUMENTS

| | | | |
|---|---|---|---|
| 2,948,487 | 8/1960 | Locklin | 242/74.2 |
| 3,233,842 | 2/1966 | Grafton | 242/74.2 |
| 3,347,486 | 10/1967 | Martin | 242/74.2 |
| 3,387,800 | 6/1968 | Hoag | 242/74.2 |
| 4,852,821 | 8/1989 | Harris et al. | 242/74 |
| 4,955,555 | 9/1990 | Person et al. | 242/74 |

FOREIGN PATENT DOCUMENTS

| | | | |
|---|---|---|---|
| 1075991 | 10/1954 | France | 242/74.1 |
| 623015 | 5/1981 | Switzerland | 242/74.1 |

Primary Examiner—Daniel P. Stodola
Assistant Examiner—John Q. Nguyen
Attorney, Agent, or Firm—Sughrue, Mion, Zinn, Macpeak & Seas

[57] ABSTRACT

A photographic film cassette has a slit formed in a core of the spool. An engaging member having a spring force is disposed within the slit. The engaging member engages with an engagement hole formed in the trailer of a photographic film, so as to prevent the film trailer from being removed from the spool. In pulling the entirety of an exposed film out of the cassette so as to develop it, the engaging member is moved to an engaging release position to disengage it from the engagement hole.

5 Claims, 10 Drawing Sheets

PHOTOGRAPHIC FILM CASSETTE HAVING A FILM ANCHOR

BACKGROUND OF THE INVENTION

The present invention relates to a photographic film cassette. In particular, the present invention is a photographic film cassette capable of detachably engaging the trailing end, or trailer, of a photographic film strip with a spool of the cassette.

DESCRIPTION OF THE RELATED ART

A conventional photographic film cassette is constructed of a cassette and a photographic film strip (hereafter simply called a film) in light-tight containment within the cassette. The cassette is constructed of a spool on which a film is wound, a trailer of the film attached to the spool, a cylindrical cassette shell for housing the spool, and a pair of caps attached to opposite sides of the cassette shell for rotatably holding the spool within the shell. The cassette shell has a film passage mouth or slit through which the film is pulled out of the cassette.

After all the frames of a film are photographed, i.e., exposed, the film cassette, with the exposed film housed within, is forwarded to a laboratory for processing. In a darkroom of the laboratory, a leader pickup jig is inserted via the film passage mouth into the cassette so as to hook perforations, on the film leader, with the jig and pull the film leader out of the film passage mouth. Since the film trailer is fixed to the spool, the film is cut with a cutter near the film passage mouth. The thus cut-off exposed film is developed by a film processor. The cassette is now under the condition in which a portion of the film extends out of the film passage mouth and is discarded, as industrial waste, in this condition. Alternatively, the cassette is disassembled using an opener, and the trailer of the exposed film is cut off from the spool by using a pair of scissors. However, this method of removing the film requires great time and labor, and thus is not efficient. Furthermore, an empty cassette is still discarded as industrial waste which is not desirable for economic and environmental reasons.

SUMMARY OF THE INVENTION

It is therefore a principal object of the present invention to provide a film cassette capable of easily detaching the film trailer from the spool without the need for cutting.

It is another object of the present invention to provide a film cassette capable of being re-used by housing an unprocessed film within an empty cassette.

In order to achieve the above, and other, objects, the present invention provides a film cassette which is provided with a movable claw within a slit formed in a core of the spool. This claw can be moved from the exterior of the cassette so that the claw is disengaged from the trailer. After disengaging the claw from the film trailer, the film trailer is pulled out of the cassette along with the entire film.

According to the present invention, the film trailer can be detachably engaged with the spool. Therefore, the entirety of the film can be pulled out of the cassette without cutting, as is necessary in conventional cassettes. Furthermore, the cassette of the present invention can be used as a container for a developed film. In such a case, after the trailer of a developed film is engaged with the claw, the spool is rotated so as to wind the developed film onto the spool.

BRIEF DESCRIPTION OF THE DRAWINGS

The above objects and advantages of the present invention will become apparent from the following detailed description when read in connection with the accompanying drawings, in which.

DETAILED DESCRIPTION OF THE PREFERRED EMBODIMENTS

Figure 1:
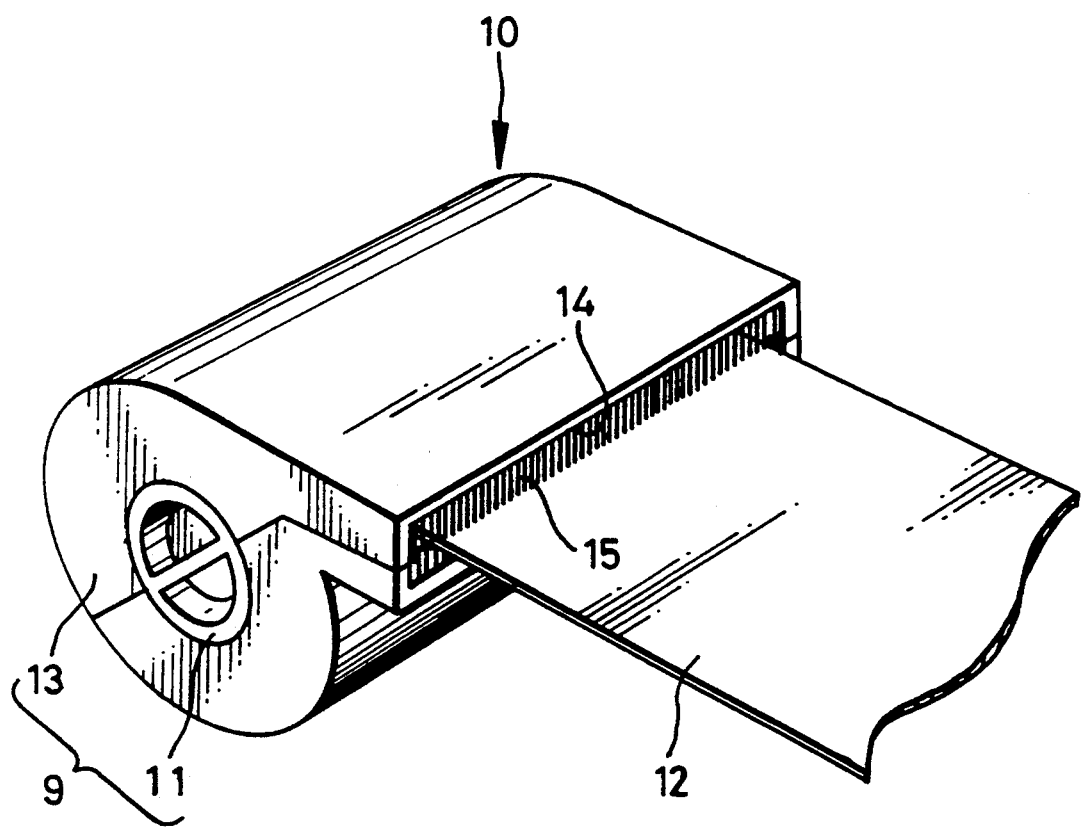
FIG. 1 is a perspective view showing a film cassette according to a preferred embodiment of the present invention.

Referring to FIG. 1, film cassette unit 10 is constructed of cassette 9 and photographic film 12 contained within cassette 9 in a light-tight manner. Cassette 9 is constructed of spool 11 on which film 12 is wound, and cassette shell 13 for rotatably housing spool 11. Cassette shell 13 is formed so as to define film passage mouth 14 through which film 12 is pulled out or inserted. Film passage mouth 14 is provided with plush 15, for trapping light, so as not to allow light to enter cassette 9. Cassette shell 13 is constructed of two cassette shell halves molded from plastics, or the like, and joined together.

Figure 2:
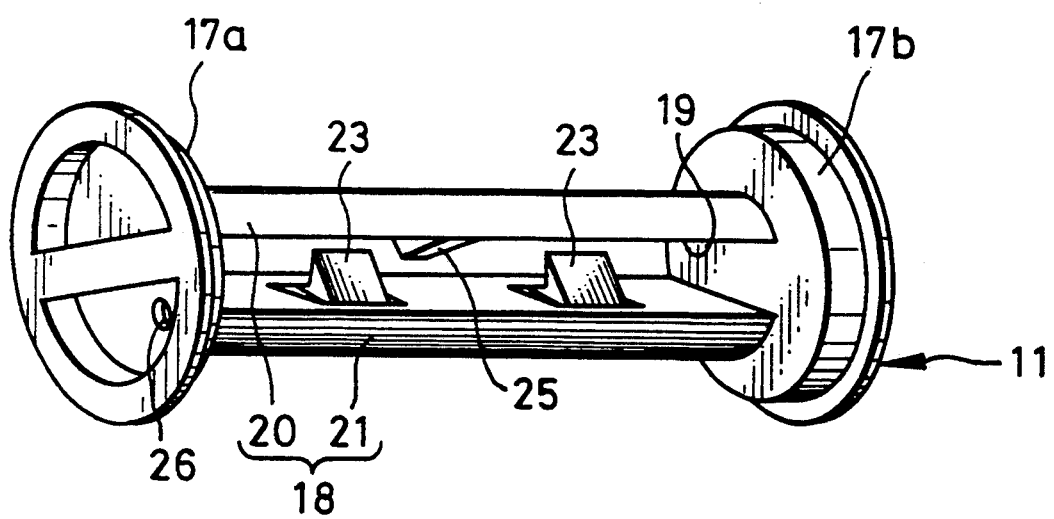
FIG. 2 is a perspective view showing the spool shown in FIG. 1.

As shown in FIG. 2, spool 11 is constructed of core 18 and a pair of flanges 17a and 17b mounted on opposite sides of core 18. Flanges 17a and 17b are rotatably supported by cassette shell 13, and extend outside of cassette shell 13. In film cassette unit 10, the pair of flanges 17a and 17b clamp the opposite sides of roll of film 12, or alternatively, a ridge mounted within cassette shell 13 pushes the outermost turn of the roll of film 12. In this condition, spool 11 is rotated in a reverse direction so that the film leader advances out of film passage mouth 14.

Core 18 is constructed of upper core portion 20 and lower core portion 21 between which slit 19 is formed for inserting film trailer 12a. Lower portion 21 is formed integrally with two claws 23 protruding toward the inside of slit 19. Film trailer 12a is formed with two engagement holes 24 which couple with the two claws 23. Upper portion 20 is integrally formed with triangular projection 25 projecting toward lower portion 21 between the two claws 23. Projection 25 pushes film trailer 12a toward claws 23. Claws 23 are formed so as to be elastically movable between the engaged position shown in FIG. 3 and the engagement released position shown in FIG. 4. Insertion hole 26 is formed within lower portion 21, extending in the axial direction with one end thereof being open at flange 17a.

The operation of the above embodiment will now be described briefly. After all frames of film 12 are exposed, film cassette unit 10 is removed from the camera, and forwarded to a laboratory for processing. Exposed film 12 is wound on spool 11 within film cassette unit 10. At the laboratory, spool 11 is rotated in reverse so as to advance the film leader out of film passage mouth 14. A conventional leader pickup jig may be inserted into film passage mouth 14 so as to hook perforations at the film leader and pull the film leader out of film passage mouth 14.

Figure 4:
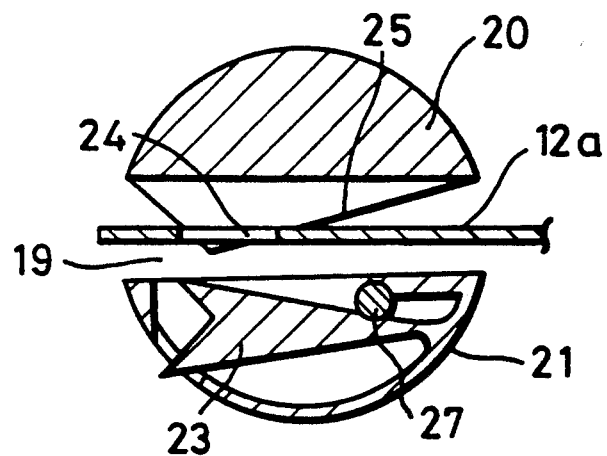
FIG. 4 is a cross section showing the core of the spool when the claws are disengaged from the film trailer.

The film leader, thus pulled out of cassette 9, is engaged by nip rollers to advance exposed film 12 out of cassette 9. Since film trailer 12a is engaged with spool 11, the operation of pulling exposed film 12 out of cassette 9 is terminated when all of film 12 is unrolled. At this time, as shown in FIG. 4, rod 27 is inserted into insertion hole 26 so that claws 23 are pushed downwardly by rod 27 and retracted from slit 19. Thus, claws 23 are separated from engagement holes 24 at film trailer 12a. Under this condition, film 12 may be pulled out so that exposed film 12 is entirely removed from cassette 9. Film trailer 12a thus pulled out of slit 19, is removed from cassette 9 via film passage mouth 14. As is well known, exposed film 12 is developed by the film processor and thereafter printed.

As described above, the entirety of exposed film 12 can be removed from cassette 9 without requiring the disassembling of cassette 9 and the cutting of exposed film 12 at a laboratory. Furthermore, empty cassette 9 with exposed film 12 completely removed may be used as a container for a developed roll of film. This operation will now be described.

Figure 7:
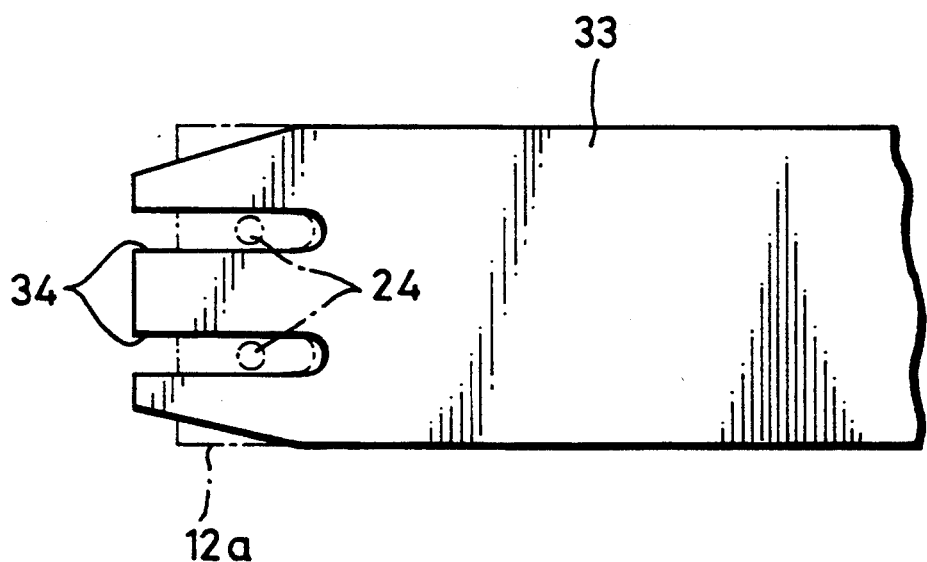
FIG. 7 is a plan view of a guide sheet for releasing an engagement of the film engaging mechanism shown in FIG. 6.

Rod 27 is inserted into insertion hole 26 so as to move claws 23 to the retracted position. Under this condition, trailer 12a of a developed roll of film is inserted into film passage mouth 14 and into slit 19. When engagement holes 24 are positioned opposite claws 23, rod 27 is pulled out of insertion hole 26 so that claws 23 move into engagement with engagement holes 24. In order to facilitate this operation, jig 33, as shown in FIG. 7, may be used.

After engaging trailer 12a of developed film 12 with spool 11, spool 11 is rotated so as to wind developed film 12 on the outer periphery of core 18. Conventionally, a developed film is cut into six-frame pieces which are then contained within pockets of a sheath. However, by using cassette 9 as a container for a developed roll of film, such sheaths become unnecessary. In addition, effective re-use of cassette 9 is possible, and the handling operation of developed films at a laboratory is simplified.

Figure 3:
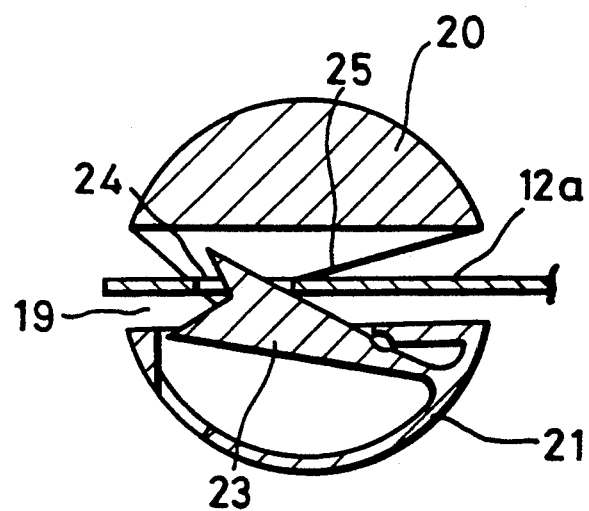
FIG. 3 is a cross section showing the core of the spool when the claws shown in FIG. 2 engage with the film trailer.

Claw 23 may be of the shape shown in FIG. 3, or other shapes, as observed from a lateral side, such as a triangle and a trapezoid. Rod 28 may have a cross section of a circle, or shapes such as a rectangle and a polygon.

Figure 5:
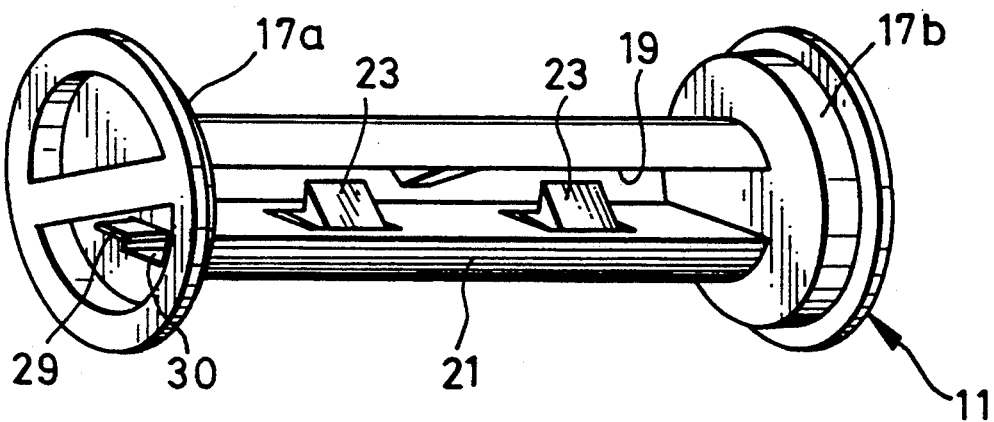
FIG. 5 is a perspective view showing a spool provided with a claw engagement releasing member.
Figure 6:
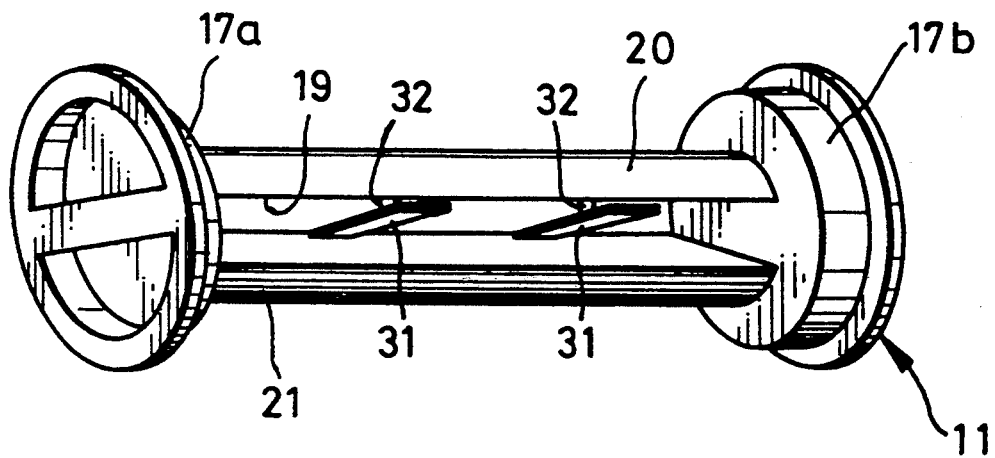
FIG. 6 is a perspective view showing a spool provided with another film engaging mechanism.

FIG. 5 shows an embodiment wherein an operation member for claws 23 is mounted on spool 11. Like elements to those shown in FIG. 2 are represented by using identical reference numerals. In this embodiment, operation plate 29 is mounted within lower portion 21, and claws 23 are fixed to operation plate 9. Operation plate 29 protrudes from opening 30 formed in flange 17a. As operation plate 29 is pushed down, within opening 30, claws 23 are moved to the engagement released position. In this embodiment, separate rod 27 is not necessary for a convenient handling operation.

Another embodiment is shown in FIGS. 6–10. Like elements to those shown in FIG. 2 are represented by using identical reference numerals. Lower ends of two spring plates 31 are fixed to lower portion 21 of spool 11 at positions within slit 19. The free ends of spring plates 31 are each mounted with pin 32. Spring plates 31 are made of thin metal, a plastic sheet material, or the like. Spring plates 31 may be formed integrally with spool 11. In disengaging film trailer 12a from pins 32, jig 33 such as shown in FIG. 7 is utilized. Jig 33 is made of a plastic sheet, an aluminum plate, a steel plate, or the like. Recesses 34 are formed in jig 33 at the position corresponding to engagement holes 24 of film trailer 2a. Recesses 34 are preferably tapered so as to allow pins 32 to easily slide relative to jig 33.

Figure 8:
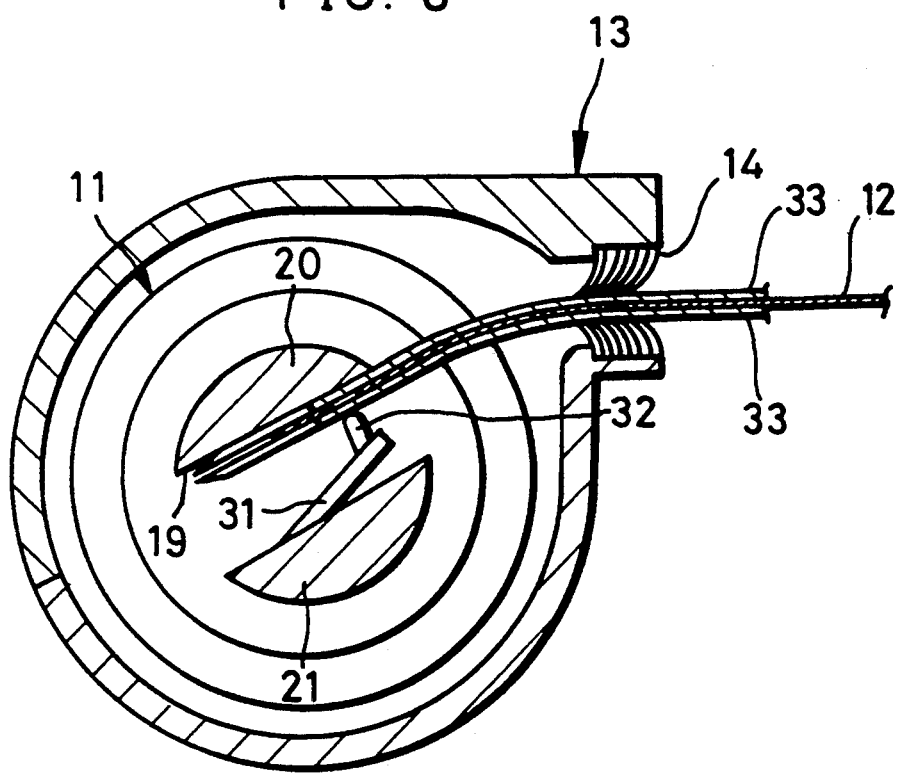
FIG. 8 is a cross section of a film cassette, showing the operation of the film engaging mechanism which operates to detach the film trailer by using two guide sheets shown in FIG. 7.
Figure 9:
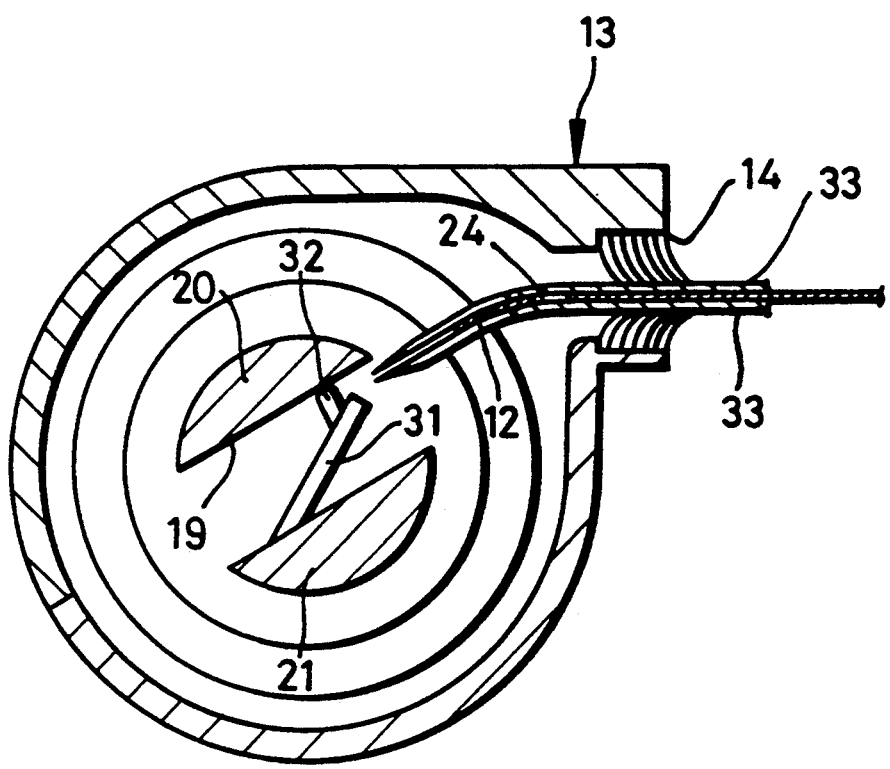
FIG. 9 is a cross section similar to FIG. 8, showing the operation of the film engaging mechanism which operates to engage with the film trailer.

In disengaging film trailer 12a from pins 32, two jigs 33 are used so as to sandwich film trailer 12a therebetween. Jigs 33 and film trailer 12a are then inserted into cassette shell 13 via film passage mouth 14 so that pins 32 enter recesses 34. By further inserting jigs 33, the jigs pass above pins 32 because the tops of pins 32 are round, as shown in FIG. 8. Therefore, pins 32 move down by an amount corresponding to the thickness of jigs 33 while deforming spring plates 31, and eventually disengaging from engagement holes 24. Exposed film 12 is slightly pulled out while maintaining jigs 33 in position thereby displacing engagement holes 24 from pins 32. Next, as shown in FIG. 9, film trailer 12a is clamped between jigs 33, and pulled out of cassette 9.

Figure 10:
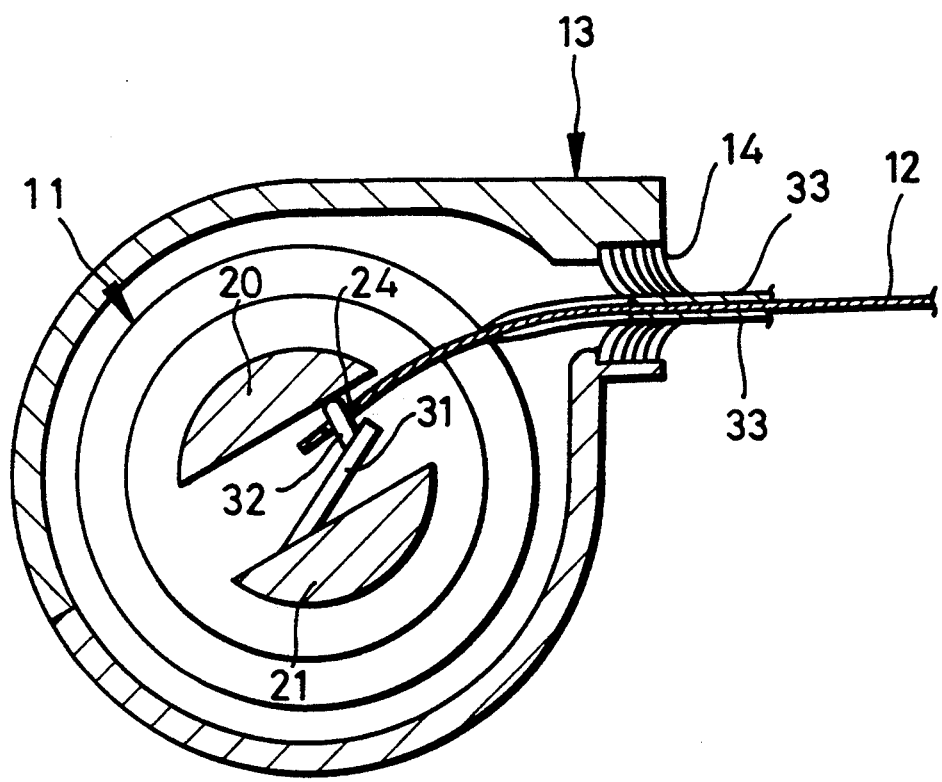
FIG. 10 is a cross section similar to FIG. 8, showing the operation of the film engaging mechanism which operates to engage with the film trailer.

In loading a developed roll of film 12 into cassette 9, film trailer 12a is squeezed with two jigs 33 and they are inserted via film passage mouth 14 into slit 19 of spool 11. During this insertion operation, pins 32 enter recesses 34 of jigs 33. Thereafter, as shown in FIG. 10, only two jigs 33 are pulled out of cassette 9.

Figure 11:
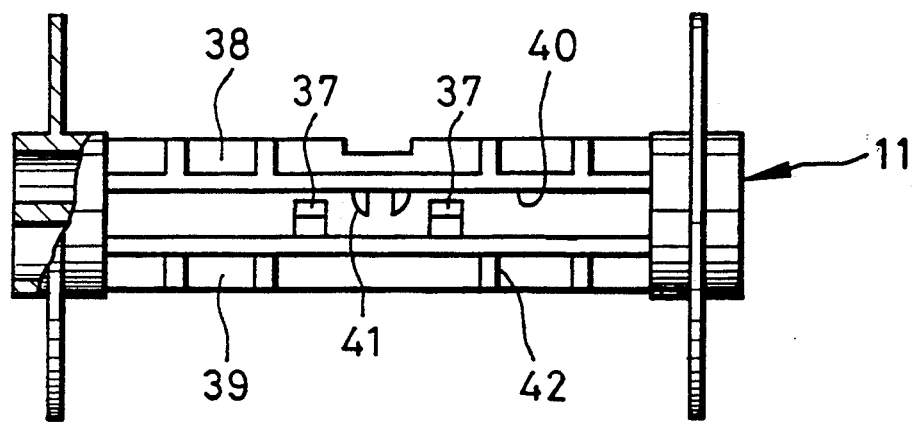
FIG. 11 is a front view of a spool provided with another film engaging mechanism.
Figure 12:
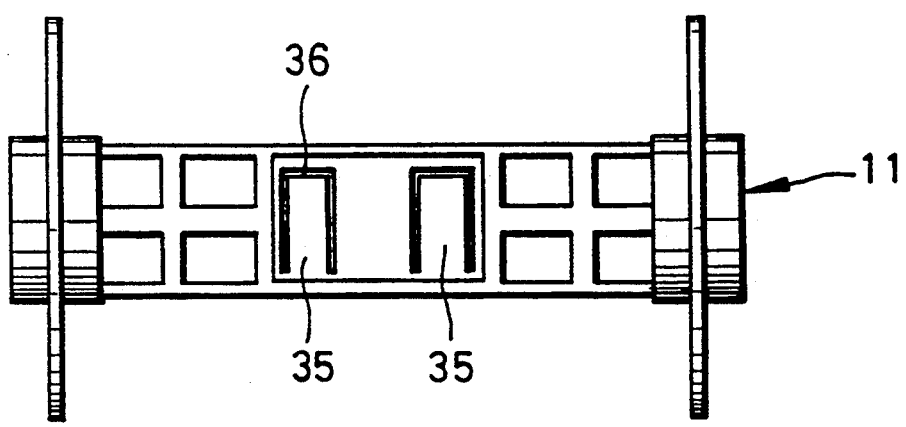
FIG. 12 is a bottom view showing the spool of FIG. 11.
Figure 13:
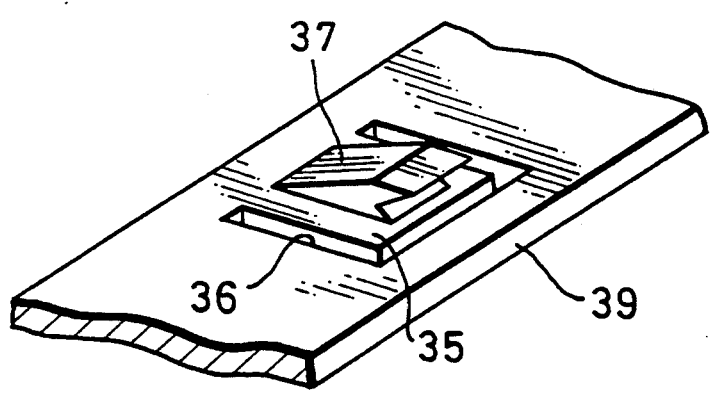
FIG. 13 is a perspective view showing the film engaging mechanism of FIG. 11.

Another embodiment is shown in FIGS. 11–13. Spool 11 has upper portion 38 and lower portion 39. Each of upper and lower portions 38 and 39 is provided with ribs 42 of a semi-circular cross-sectional shape in order to minimize weight of these portions. Slit 40 is formed between upper and lower portions 38 and 39. Protrusions 41 are formed on upper portion 38, extending toward the inside of slit 40 for pushing down on a film trailer. Two claws 37 are integrally formed with lower portion 39. Lower portion 39 is formed with claw plates 35 having elastic properties. Claw plates 35 are defined by channel grooves 36 formed in lower portion 39. Claws 37 are integrally formed with claw plates 35, claws 37 being disposed on claw plates 35. In this embodiment, as described previously, film trailer 12 is detachably engaged with spool 11 by using jigs.

Figure 14:
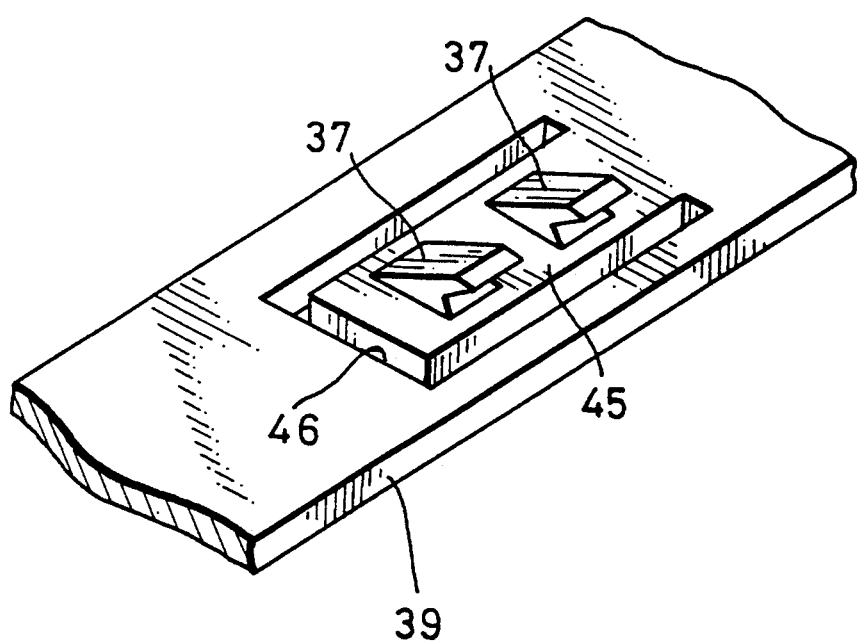
FIG. 14 is a perspective view showing the main part of an embodiment wherein two claws are formed on a claw plate.
Figure 15:
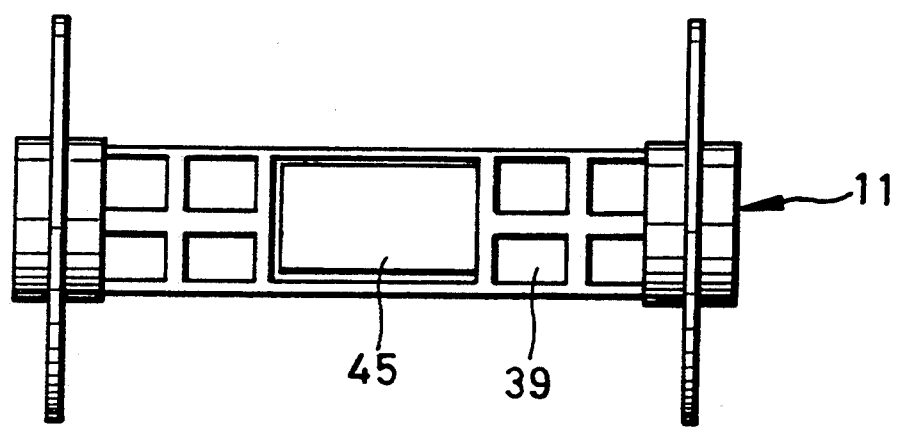
FIG. 15 is a bottom view of the spool having the film engaging mechanism shown in FIG. 14.

FIGS. 14 and 15 show an embodiment wherein two claws 37 are formed on a single claw plate 45. Claw plate 45 is defined by groove 46. This embodiment operates similarly to those discussed above.

Figure 16:
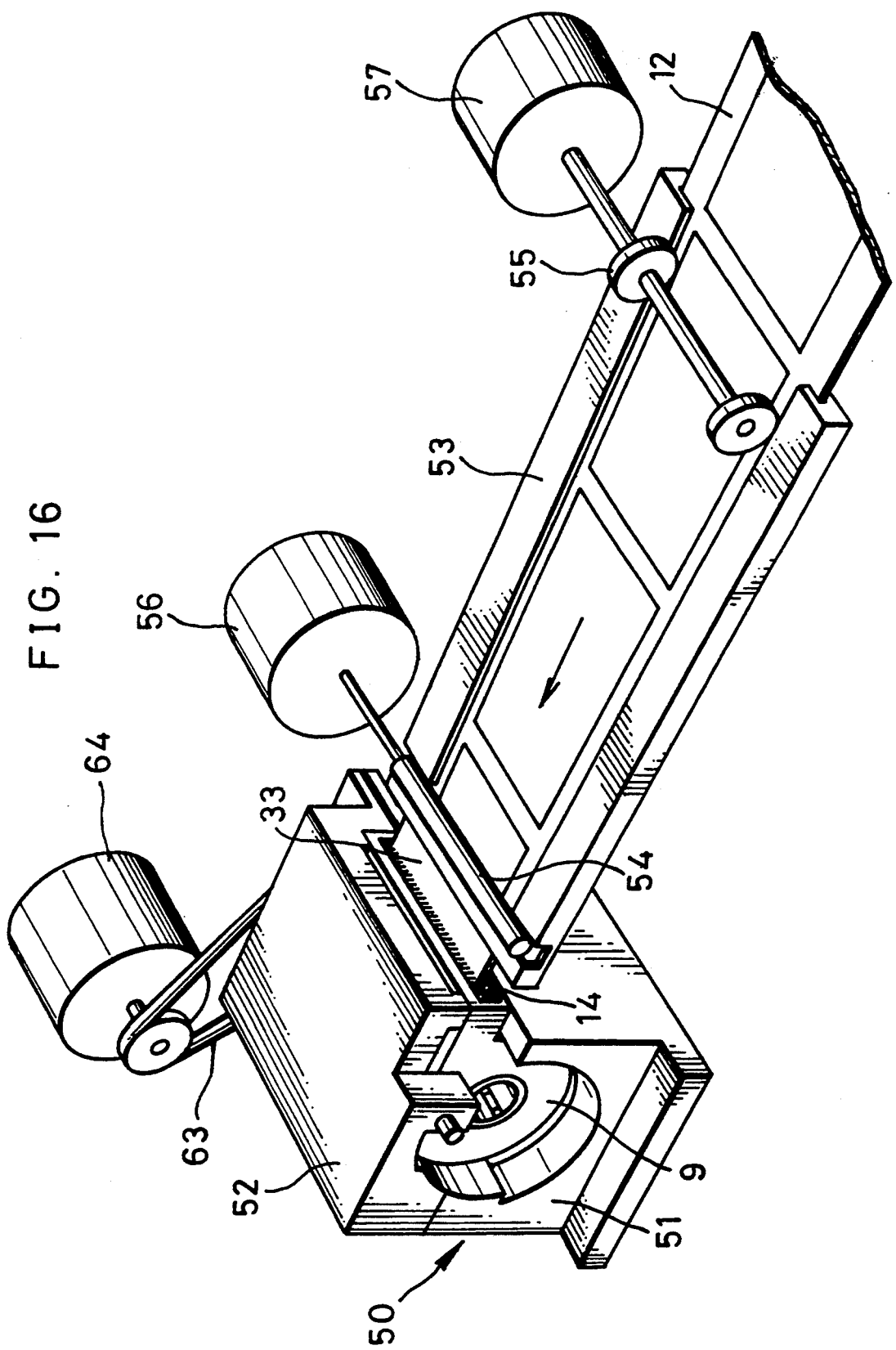
FIG. 16 is a schematic diagram showing an apparatus for winding a developed film on a cassette shell.
Figure 17:
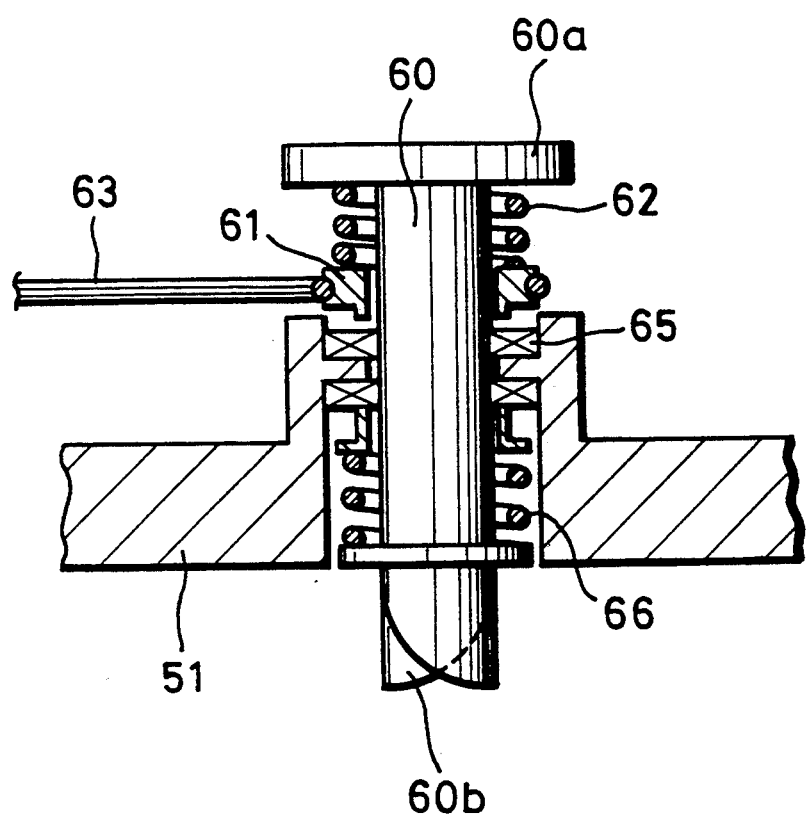
FIG. 17 is a cross section of a spool rotation mechanism used with the film winding apparatus of FIG. 16.

FIGS. 16 and 17 show a winding apparatus for winding a developed film into cassette 9. Cassette holder 50 is constructed of body 51 and cover 52, with the both sides being opened. Empty cassette 9 is inserted from one side in the axial direction of cassette holder 50 so as to set empty cassette 9 within cassette holder 50. Alternatively, cover 52 may be swingably opened to load empty cassette 9 within body 51. In front of cassette holder 50, there is disposed film guide 53 along which developed film 12 is transported to cassette 9. Transporting rollers 54 and 55, which are respectively driven by motors 56 and 57, are disposed along guide 52.

As shown in FIG. 17, winding shaft 60 is rotatably mounted on body 51. Pulley 61 is loosely fitted on winding shaft 60. Between pulley 61 and ring portion 60a, spring 62 is interposed so as to constitute a friction clutch mechanism. Belt 63 is extended between pulley 61 and motor 64 so that the rotation of motor 64 is transmitted via the friction clutch mechanism to winding shaft 60. At the distal end of winding shaft 60, fork 60b, to be engaged with spool 11, is mounted. Reference numeral 65 represents a bearing, and reference numeral 66 represents a spring.

Figure 18:
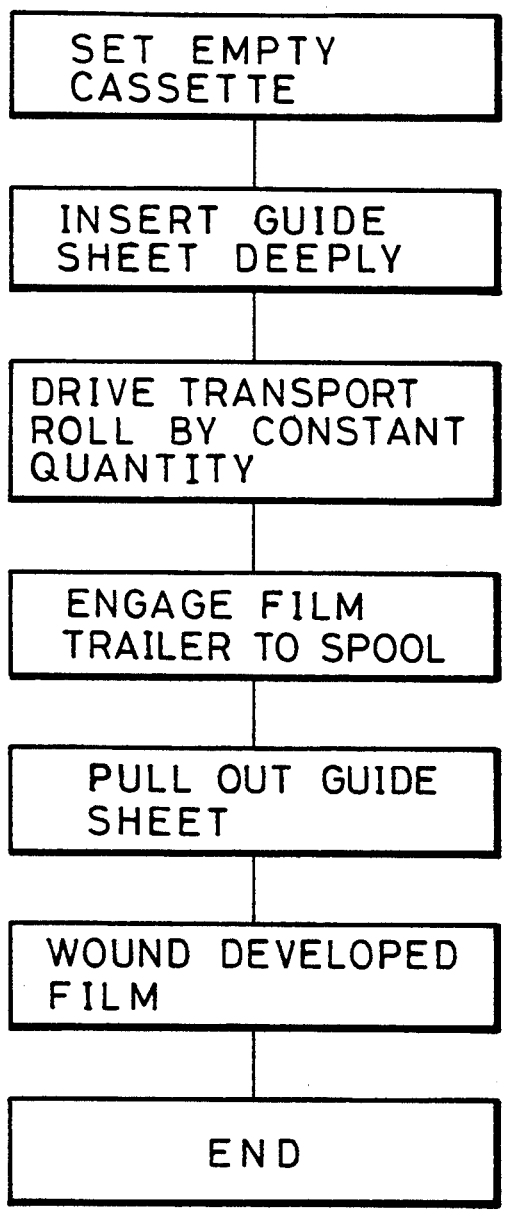
FIG. 18 is a flow chart explaining the procedure of winding a developed film into a cassette by using the film rewinding apparatus shown in FIG. 16.

FIG. 18 is a flow chart illustrating the procedure of winding developed film 12 into cassette 9. First, empty cassette 9 is set to cassette holder 50. Next, spool 11 is positioned so as to make slit 19 face film passage mouth 14. Two jigs 33, shown in FIG. 7, are superimposed one upon the other, and inserted into film passage mouth 14 and into slit 19. Trailer 12a of developed film 12 is entered between jigs 33, and motors 56 and 57 are rotated at a constant angular velocity. Then, transporting rollers 54 and 55 are thereby rotated so as to feed film trailer 12a into cassette 9. Film trailer 12a is guided by jigs 33 and enters slit 19 of spool 11. Then, engagement holes 24 of film trailer 12a are engaged with pins 32. After removing jigs 33, motors 56, 57, and 64 are driven so as to rotate transporting rollers 54 and 55 and winding shaft 60. Since fork 60b of winding shaft 60 is coupled to spool 11, developed film 12 thus is wound on the outer periphery of spool 11.

Figure 19:
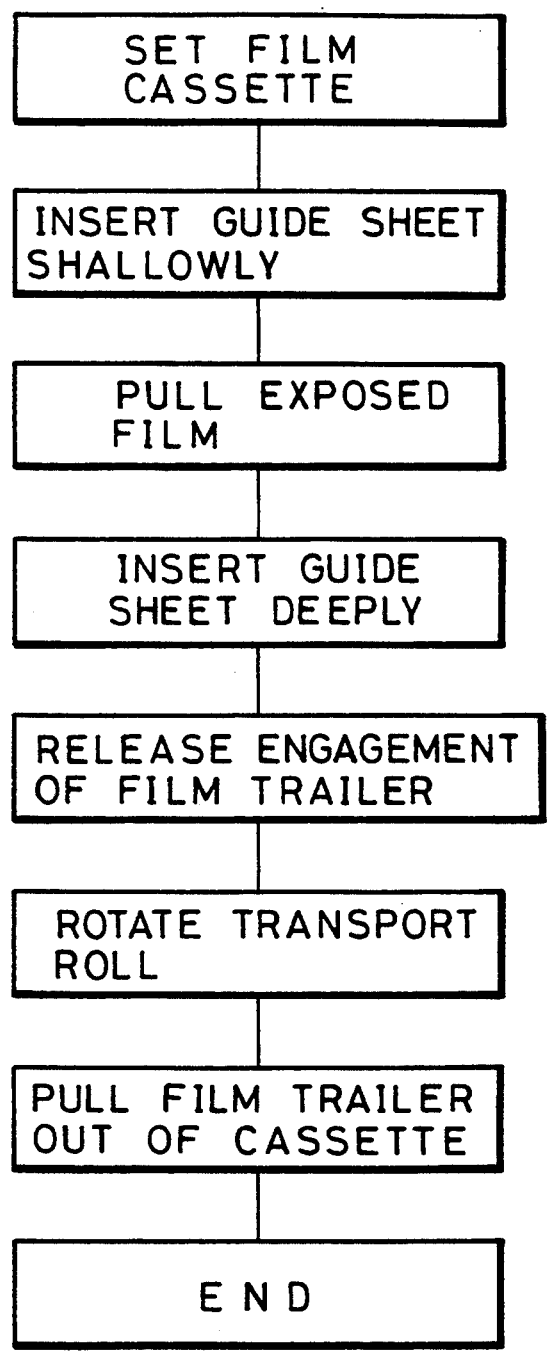
FIG. 19 is a flow chart explaining the procedure of pulling an exposed film out of a cassette by using the film winding apparatus of FIG. 16.

The film winding apparatus may be used for pulling exposed film 12 out of cassette 9 by a reverse operation. FIG. 19 is a flow chart illustrating the procedure of pulling exposed film 12 out of cassette 9. First, film cassette unit 10 containing exposed film 12 is set to cassette holder 50. Next, jigs 33 are partially inserted into cassette 9. Then, motors 56, 57, and 64 are driven. Winding shaft 60 is then rotated, in a reverse direction, by motor 64 so that the leader of exposed film 12 is advanced out of film passage mouth 14, and then pulled out by transporting rollers 54. After most of exposed film 12 is pulled out, jigs 33 are inserted further into cassette 9, and as shown in FIG. 8, pins 32 are disengaged from engaging holes 24. Motors 56 and 57 are again driven to pull film trailer 12a out of cassette 9. Exposed film 12 pulled out of cassette 9 is sent via guide 53 to a film processor where it is developed. The film winding apparatus may also be used for the film cassette whose spool has claws 37, as shown in FIGS. 11-15.

In the above embodiments, although the spool has two pins or claws, the number of these elements may vary. Furthermore, in the embodiment shown in FIG. 2, insertion hole 26 may be formed in both flanges 17a and 17b.

Although the present invention has been fully described by way of the preferred embodiments thereof with reference to the accompanying drawings, various changes and modifications can be made without departing from the scope of the present invention as recited in the appended claims.

What is claimed is:

1. A photographic film cassette, comprising:
a spool having a core on which photographic film is wound, said core also having a slit formed therein into which a trailer of said photographic film is inserted, said slit dividing said core into first and second portions, said second portion having a cavity defined therein and an aperture formed in a surface thereof which opposes said first portion;
an engaging member for engaging with said trailer, said engaging member being mounted in cantilever fashion in said cavity and extending through said aperture and a free end thereof projecting into said slit, said engaging member being movable between a first position where said engaging member is engaged with said trailer and a second position where said engaging member is disengaged from said trailer; and
a cassette shell for rotatably housing the spool, said cassette shell being formed with a film passage mouth through which said photographic film may pass.

2. A photographic film cassette according to claim 1, wherein said trailer has at least one engagement hole formed therein which engages with said engaging member when said engaging member is in said first position.

3. A photographic film cassette according to claim 2, further comprising a protrusion, formed on said spool, for biasing said film trailer toward said engaging member.

4. A photographic film cassette according to claim 3, wherein said core of said spool has a hole formed therein at a position which is proximate said engaging member, said hole communicating with an exterior of said spool, and, when an external member is inserted into said spool through said hole, said external member comes into contact with said engaging member and moves said engaging member from said first position to said second position.

5. A photographic film cassette according to claim 3, wherein said engaging member is integrally coupled to an operation member, said operation member extending to an exterior of said spool, and, when said operation member is moved, said engaging member moves from said first position to said second position.

* * * * *